United States Patent [19]

Yamazaki et al.

[11] Patent Number: 4,586,058

[45] Date of Patent: Apr. 29, 1986

[54] INK JET PRINTING APPARATUS

[75] Inventors: Hiroshi Yamazaki; Takuro Isayama, both of Tokyo; Minoru Ameyama, Yokohama; Shuzo Matsumoto, Yokohama; Yasuo Katano, Yokohama, all of Japan

[73] Assignee: Ricoh Company, Ltd., Tokyo, Japan

[21] Appl. No.: 640,126

[22] Filed: Aug. 13, 1984

[30] Foreign Application Priority Data

Aug. 15, 1983 [JP] Japan ................................ 58-148927

[51] Int. Cl.[4] ................................ G01D 15/16

[52] U.S. Cl. ................................ 346/140 R

[58] Field of Search ................................ 346/140, 75

[56] References Cited

U.S. PATENT DOCUMENTS 3,708,798 1/1973 Hildenbrand ........................ 346/140
3,805,276 4/1974 Ishii ........................ 346/140
4,126,868 11/1978 Kirner ........................ 346/140
4,301,459 11/1981 Isayama ........................ 346/140
4,394,669 7/1983 Ozawa ........................ 346/140

*Primary Examiner*—Joseph W. Hartary
*Attorney, Agent, or Firm*—Oblon, Fisher, Spivak, McClelland & Maier

[57] ABSTRACT

An ink jet printing apparatus capable of removing bubbles introduced into ink which is routed from an ink supply cartridge to a plurality of nozzles. A head holder adapted to support a head, which has the nozzles, is formed with an ink supply path for delivering ink from the ink supply cartridge to the nozzles. The ink supply path branches into an upwardly extending passageway and a downwardly extending passageway. The ink is supplied to the nozzles by way of the downward passageway. A check valve is positioned in the upward passageway for trapping bubbles entrained by the ink. The bubbles trapped by the check valve are discharged by a suction pump.

11 Claims, 4 Drawing Figures

INK JET PRINTING APPARATUS

BACKGROUND OF THE INVENTION

1. Field of the Invention

The present invention relates to an ink jet printing apparatus capable of effectively removing bubbles introduced into ink, which is supplied to nozzles of the apparatus, to thereby eliminate clogging attributable to solidification of the ink in the nozzles.

2. Discussion of the Background

Generally, in an ink jet printer, bubbles introduced into or formed in ink have to be removed in order to insure ejection of uniform ink drops and, thereby, high image quality. Such a demand has heretofore been implemented by a bubble trap which is located in an ink supply path and constructed to allow trapped bubbles to be discharged from time to time by a venting device or the like. The problem with this type of implementation is that since the bubble trap when filled with bubbles causes them to be communicated to a head, it is necessary to constantly sense the varying amount of bubbles in the bubble trap and, therefore, to use special sensor means therefor.

SUMMARY OF THE INVENTION

It is therefore an object of the present invention to provide an ink jet printing apparatus which is capable of discharging bubbles smoothly.

It is another object of the present invention to provide an ink jet printing apparatus which is capable of freeing nozzles from being clogged by moistening them with ink, which is to be discarded at the time of bubble discharging.

It is another object of the present invention to provide a generally improved ink jet printing apparatus.

An ink jet printing apparatus of the present invention has a function of discharging bubbles which are introduced into ink supplied from a source of ink supply and comprises a head support formed with an ink supply path which includes an upward passageway and a downward passageway for branching a stream of the ink from the source of ink supply upwardly and downwardly, respectively, a bubble trap disposed in the upward passageway for trapping bubbles introduced into the ink in the upward passageway, and a head formed with nozzles to which the ink flowing through the downward passageway is supplied and a bubble discharge channel for guiding and discharging the bubbles trapped by the bubble trap.

In accordance with the present invention, an ink jet printing apparatus is provided which is capable of removing bubbles introduced into ink which is routed from an ink supply cartridge to a plurality of nozzles. A head holder adapted to support a head, which has the nozzles, is formed with an ink supply path for delivering ink from the ink supply cartridge to the nozzles. The ink supply path branches into an upwardly extending passageway and a downwardly extending passageway. The ink is supplied to the nozzles by way of the downward passageway. A check valve is positioned in the upward passageway for trapping bubbles entrained by the ink. The bubbles trapped by the check valve are discharged by a suction pump.

The above and other objects, features and advantages of the present invention will become apparent from the following detailed description taken with the accompanying drawings.

DESCRIPTION OF THE PREFERRED EMBODIMENTS

While the ink jet printing apparatus of the present invention is susceptible of numerous physical embodiments, depending upon the environment and requirements of use, subtantial numbers of the herein shown and described embodiments have been made, tested and used, and all have performed in an eminently satisfactory manner.

Figure 1:
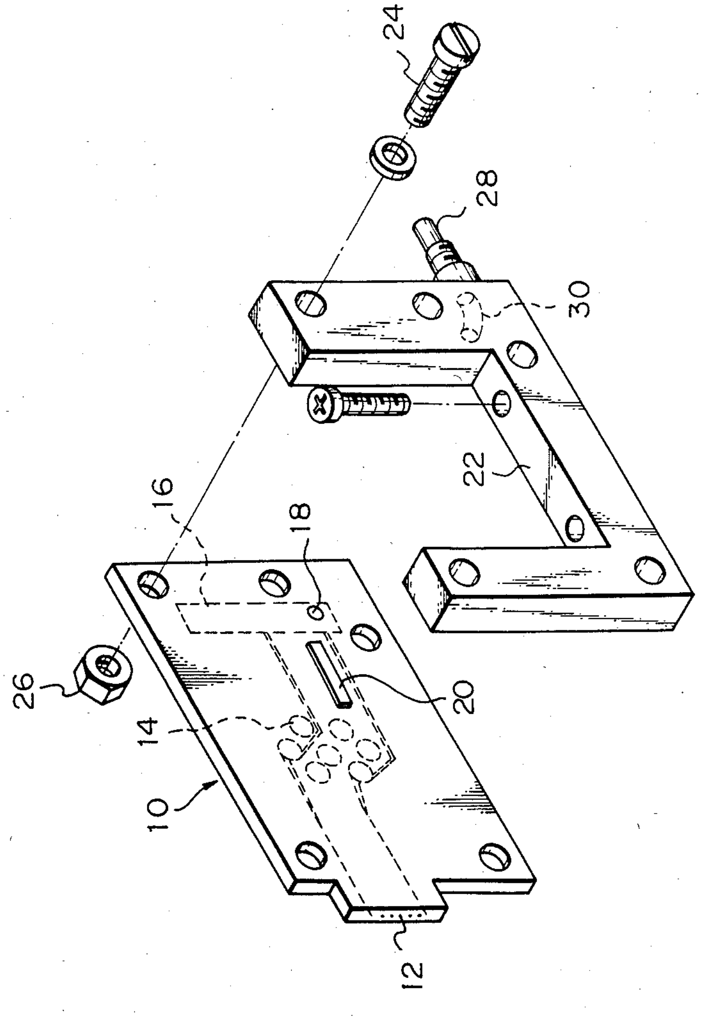
FIG. 1 is a view of a head and a head holder applicable to the ink jet printing apparatus of the present invention.

Referring to FIG. 1 of the drawings, a head and a head holder applicable to the ink jet printing apparatus of the present invention are shown. The printer comprises a head, generally 10, which is made up of a top cover and a base bonded together by fusion and each consisting of an about 2 millimeters thick photosensitive sheet of glass. Formed between the opposite photosensitive glass sheets are nozzles 12, ink chambers 14, a common ink chamber 16, an ink supply port 18, etc. An electrostrictive vibrator 20 is associated with each of the ink chambers 14. The head 10 having such a structure is securely fastened to a head holder 22 by screws 24 and nuts 26. The head 10, which is about 5–10 millimeters thick, is provided with an ink inlet 28 to which ink is fed from an ink supply cartridge, which will be described later. The ink from the ink inlet 28 is routed to the head 10 via an ink supply path 30 formed in the head holder 22. As described later in detail, the head holder 22 is provided with ink purifying means such as a filter in the ink supply path 30.

Figure 2:
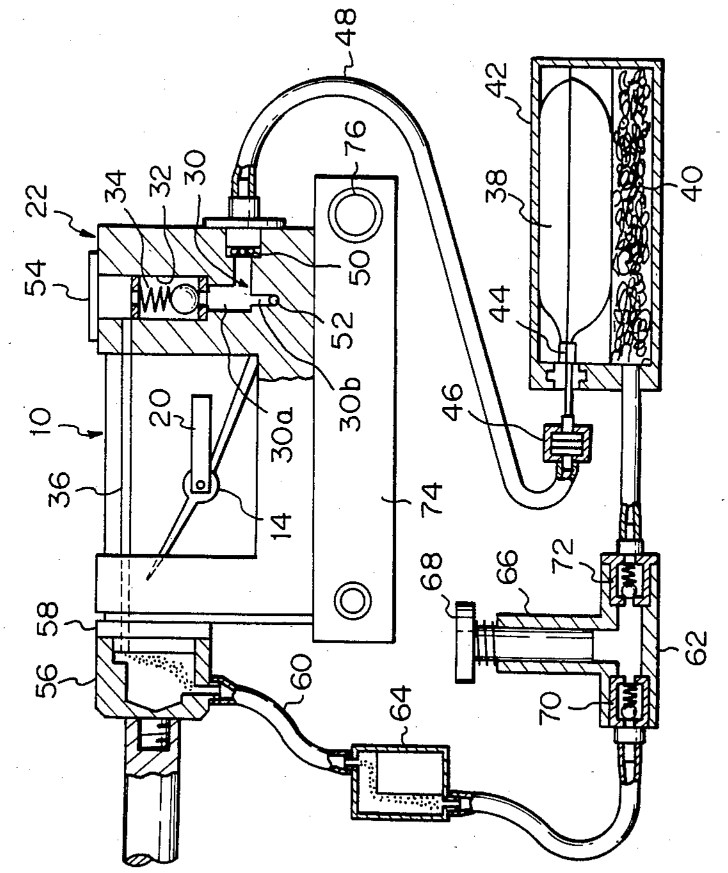
FIG. 2 is a view of an ink jet printing apparatus with a bubble discharging device embodying the present invention.

Referring to FIG. 2, an ink jet printer is shown in which a head holder with a head such as shown in FIG. 1, an ink supply section, an ink collection section, and a bubble discharge mechanism in accordance with the present invention are built. As shown, the ink supply path 30 branches into an upwardly extending passageway **30*a* and a downwardly extending passageway 30*b*. The upward passageway 30*a* is partly enlarged to form an enlarged passageway 32 in which a check valve 34 is disposed. A bubble discharge channel 36 is formed through an uppermost portion of the head 10 by etching or like technique so that trapped bubbles may be guided therethrough to the outside. An ink supply cartridge 38 and a waste ink cartridge 40 are accommodated integrally in a cartridge holder 42. Ink in the ink supply cartridge 38 is routed to the head holder 22 via an ink supply needle 44, a first filter 46, and a flexible ink supply tube 48. The ink reaching the head holder 22 flows into the head 10 by way of a second filter 50 and a hole 52 which communicates the downward passageway 30*b* to the head 10. The upward passageway 30*a* is adapted to allow bubbles to rise and accumulate therein and, as previously mentioned, the check valve 34 is positioned in its upper portion, i.e. in the enlarged passageway 32. The check valve 34 opens by a pressure higher than a predetermined value so as to allow the accumulated bubbles into the bubble discharge channel 36. The top of the enlarged passageway 34 is stopped by a closure member 54**.

At the time of discharging the bubbles, a cap 56 is attached to the head 10 to cover the surface where the nozzles 12 are open and thereby isolate them from the atmosphere. A flange 58 surrounds the nozzles 12 in order to maintain the cap 56 disengaged from the surface of the nozzles 12 so that dust or the like is prevented from being deposited on the walls of the nozzles. That is, the flange 58 serves to define a space between the cap 56 and the nozzles 12. The cap 56 is communicated to a suction pump 62 for collection by a flexible collection tube 60. An ink trap 64 is disposed in the collection tube 60 for trapping a predetermined amount of waste ink which is sucked by the pump 62.

The collection pump 62 comprises a cylinder 66 and a piston 68. The waste ink is sucked into the cylinder 66 via an inlet valve 70 and the discharged therefrom via an outlet valve 72 to be thereby collected in the waste ink cartridge 40. The head 10 and head holder 22 are mounted on a carriage 74 which is movable on and along a guide rod 76.

Figure 3:
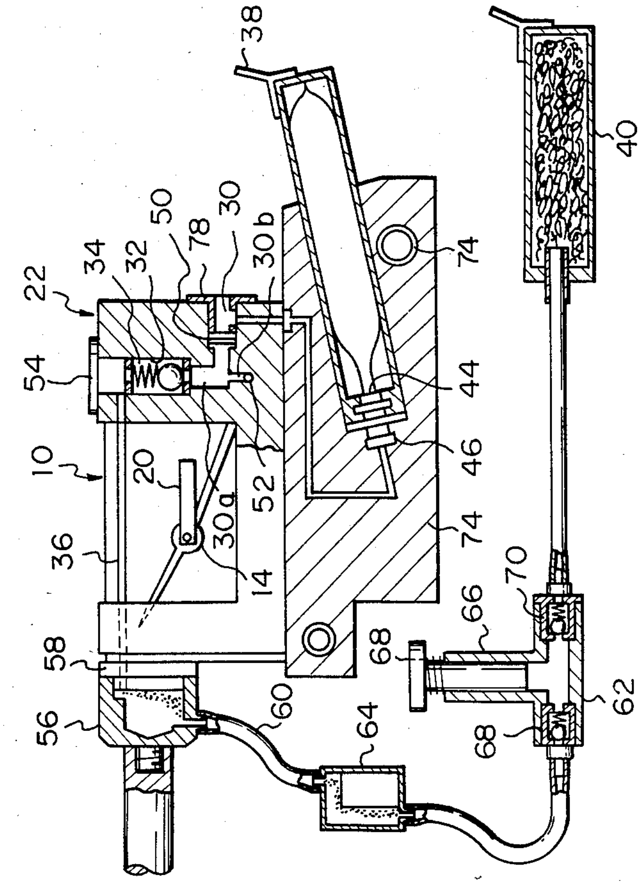
FIGS. 3 and 4 are views of other embodiments of the present invention each being furnished with a bubble discharging device.

Referring to FIG. 3, another embodiment of the present invention is shown in which the ink supply cartridge 38 is loaded on the carriage 74 and the ink supply tube 48 shown in FIG. 1 is omitted. In this particular embodiment, the waste ink cartridge 40 is fixed in place and constructed independently of the ink supply cartridge 38. A closure member 78 is plugged in the ink supply path 30. In FIG. 3, the same reference numerals as those shown in FIG. 2 designate the same structural elements. Alternatively, the ink supply cartridge 38 and the waste ink cartridge 40 may have an integral construction and be mounted on the carriage 74. Such an alternative construction, however, needs to be elaborated to prevent the waste ink from dropping the portion of the tube 60 which connects to the waste ink cartridge 40. Further, where the tube 60 is connected to the carriage 74, it is necessary to prevent the ink from spilling to the outside from the cap 56 due to oscillation of the tube 60.

Figure 4:
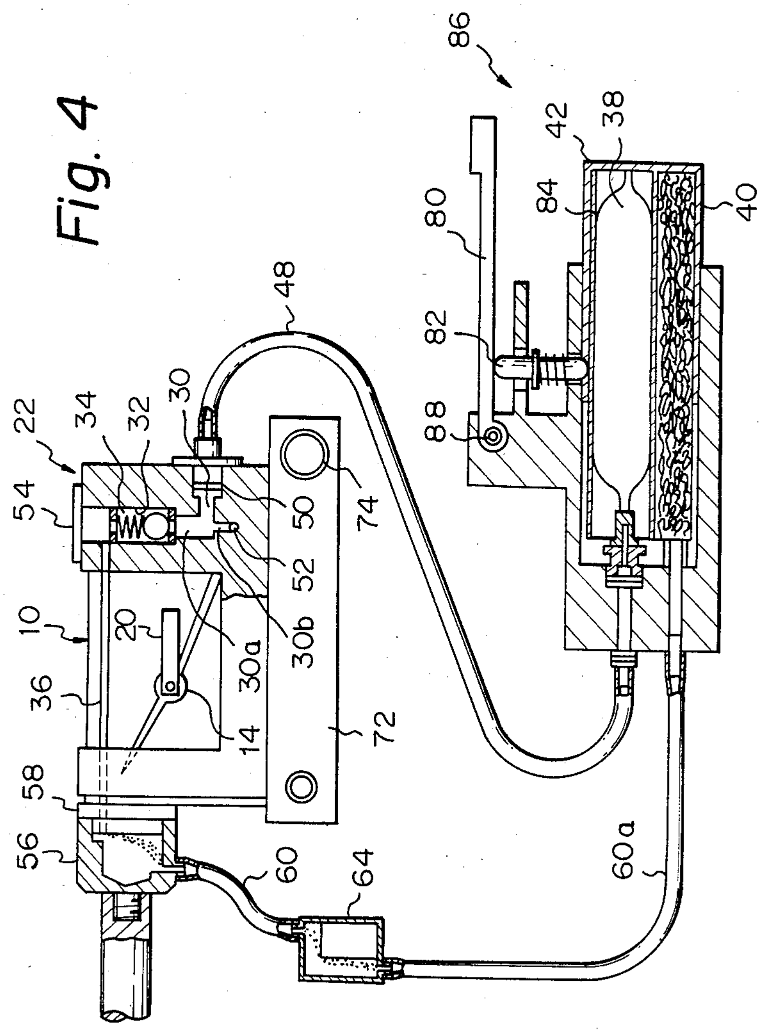

Still another embodiment of the present invention is shown in FIG. 4. In FIG. 4, the same or similar structural elements as those shown in FIG. 2 are designated by the same reference numerals. The embodiment shown in FIG. 4 is similar to that of FIG. 2 concerning the integral and stationary construction of the ink supply cartridge 38 and waste ink cartridge 40. A characteristic feature of the printer shown in FIG. 4 is the use of a compressing device, generally indicated by reference number 86, for compressing the fresh ink in the cartridge 38 and thereby discharging bubbles out of the head. As shown, the compressing device 86 comprises a lever 80, a pressing rod 82, and a pressing plate 84. a spring 88 is associated with the lever 80 for returning it after compression. The ink is allowed to fall by gravity from the ink trap 64 through a tube 60*a* which has a relatively large diameter.

The operation of the ink jet printer of the present invention will be described with reference to FIG. 2 by way of example. Generally, bubbles may be introduced into the ink from the outside via the tubing or the like during a long period of suspension of operation, or from the ink supply needle 44 during loading or unloading of the ink cartridge. To remove the bubbles, the cap 56 is attached to the nozzles 12 while holding the carriage 74 at the home position. When the printing operation has failed in the course of printing, one can observe if the ink supply cartridge 38 is empty (in the case of a cartridge with an empty sensor, by checking the empty display) and, if it is not empty, return the carriage 74 to its home position, then cover the nozzles 12 with the cap 56, and then operate (either manually or automatically) the suction pump 62 to suck bubbles out of the ink chambers 14 and 16 and/or the ink in the ink supply path 30 together with the ink. As the vacuum is intensified beyond a predetermined level, the check valve 34 in the head holder 22 is opened so that the bubbles accumulated in the enlarged portion 32*a* of the upward passageway 32 are dissipated to the outside via the bubble discharge channel 36. The resistance to the fluid flow inside the bubble discharge channel 36 is selected to be smaller than the resistance inside the ink supply path 30 leading to the nozzles 12, i.e. downward passageway 30*b*. The pressure which causes the check valve 34 to open is adjustable to establish a flow rate of the ink which clears the nozzles 12 of clogging and, at the same time, dissipates bubbles from the ink chambers 14 and 16. A predetermined amount of discharged waste ink is stored in the ink trap 64 before reaching the pump 62 so as to moisten the walls of the nozzles 12 when the cap 56 is fit on the head 10 while the printer is not operated, thereby preventing the nozzles 12 from being clogged up due to dryness.

In summary, it will be seen that the present invention is capable of smoothly discharging bubbles from ink supply passages and ink chambers in a head of an ink jet printer, frees the head from failures attributable to deposition of dust on the walls of nozzles, e.g., changes in the direction of ink ejection, and utilizes waste ink for the purpose of moistening the nozzles while the printer is not used and, thereby, preventing ink in the nozzles to be dried to choke up the nozzles.

Various modifications will become possible for those skilled in the art after receiving the teachings of the present disclosure without departing from the scope thereof.

What is claimed is:

1. An ink jet printing apparatus having a function of discharging bubbles which are introduced into ink supplied from a source of ink supply, comprising:

head support means formed with an ink supply path which includes an upward passageway and a downward passageway for branching a stream of the ink from the source of ink supply upwardly and downwardly, respectively;

bubble trapping means located in said head support means and disposed in said upward passageway for trapping bubbles introduced into the ink in said upward passageway;

a head formed with a plurality of nozzles to which the ink flowing through the downward passageway is supplied; and bubble discharge channel means located in said head for guiding and discharging the bubbles trapped by said bubble trapping means.

2. An ink jet printing apparatus as claimed in claim 1, in which the bubble trap means comprises a check valve which opens in response to a pressure higher than a predetermined level.

3. An ink jet printing apparatus as claimed in claim 1, wherein said bubble discharge channel means includes means for generating an internal resistance to a fluid flow, said resistance being smaller than an internal resistance of the downward passageway to fluid flow.

4. An ink jet printing apparatus as claim 1, further comprising bubble discharging means for discharging the bubbles from the bubble discharge channel.

5. An ink jet printing apparatus having a function of discharging bubbles which are introduced into ink supplied from a source of ink supply, comprising:

head support support means formed with an ink supply path which includes an upward passageway and a downward passageway for branching a stream of the ink from the source of ink supply upwardly and dwnwardly, respectively;

bubble trapping means disposed in said upward passageway for trapping bubbles introduced into the ink in said upward passageway; and a head formed with a plurality of nozzles to which the ink flowing through the downward passageway is supplied; and bubble discharge channel means located in said head for guiding and discharging the bubbles trapped by said bubble trapping means, wherein said bubble discharging means further comprises means for collecting ink from the nozzles.

6. An ink jet printing apparatus as claimed in claim 5, further comprising a cap for sealingly covering the nozzles when the bubbles in the bubble discharge channel means are discharged and the ink in the nozzles is collected.

7. An ink jet printing apparatus as claimed in claim 6, in which the bubble discharging means comprises suction means for sucking the bubbles in the bubble discharge channel means and the ink in the nozzles by applying vacuum to the interior of the cap.

8. An ink jet printing apparatus as claimed in claim 7, in which said suction means comprises an ink collection pump.

9. An ink jet printing apparatus as claimed in claim 8, further comprising an ink collection tube communicating the cap to said ink collection pump.

10. An ink jet printing apparatus as claimed in claim 9, further comprising an ink trap for moistening the nozzles which is located in said ink collection tube.

11. An ink jet printing apparatus as claimed in claim 5, in which the bubble discharging means further comprises compressing means disposed in the ink supply path for compressing ink in said source of ink supply.

* * * * *